(12) United States Patent
Karpin et al.

(10) Patent No.: US 10,540,044 B2
(45) Date of Patent: Jan. 21, 2020

(54) CAPACITIVE SENSING WITH MULTI-PATTERN SCAN

(71) Applicant: Cypress Semiconductor Corporation, San Jose, CA (US)

(72) Inventors: Oleksandr Karpin, Lviv (UA); Mykhaylo Krekhovetskyy, Lviv (UA); Ruslan Omelchuk, Lviv (UA); Roman Ogirko, Lviv (UA); Victor Kremin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/476,217

(22) Filed: Mar. 31, 2017

(65) Prior Publication Data

US 2018/0164915 A1   Jun. 14, 2018

Related U.S. Application Data

(60) Provisional application No. 62/434,099, filed on Dec. 14, 2016.

(51) Int. Cl.
| | | |
|---|---|---|
| G06K 9/00 | (2006.01) | |
| G06K 9/22 | (2006.01) | |
| G06F 3/041 | (2006.01) | |
| G06F 3/044 | (2006.01) | |

(52) U.S. Cl.
CPC ............ *G06F 3/044* (2013.01); *G06F 3/0416* (2013.01); *G06K 9/001* (2013.01); *G06K 9/0002* (2013.01)

(58) Field of Classification Search
CPC .............. G06F 3/044; G06F 3/0416; G06F 2203/04111; G06F 3/0418; G06K 9/0002; G06K 9/0008; G06K 9/00006–0002
See application file for complete search history.

(56) References Cited

U.S. PATENT DOCUMENTS

| | | | |
|---|---|---|---|
| 4,353,056 A | 10/1982 | Tsikos | |
| 6,825,833 B2 * | 11/2004 | Mulligan | ................ G06F 3/044 178/18.06 |
| 7,375,535 B1 | 5/2008 | Kutz et al. | |

(Continued)

OTHER PUBLICATIONS

US 9,230,149 B2, 01/2016, Benkley, III (withdrawn)

(Continued)

*Primary Examiner* — Patrick F Marinelli
(74) *Attorney, Agent, or Firm* — Lowenstein Sandler LLP

(57) ABSTRACT

The sensing circuit includes including first input of a first electrode, a first set of inputs of a first set of two or more electrodes forming a first intersection and a second intersection, and a second set of inputs of a second set of two or more electrodes forming the second intersection and a third intersection. The sensing circuit includes a scan control circuit, coupled to the touch panel of electrodes, to concurrently select the sets of electrodes via a multiplexer. The touch sensing circuit includes an analog front end configured to generate digital values representative of mutual capacitances of a first and second unit cell, wherein the first unit cell comprises the first and second intersections and the second unit cell comprises the second and third intersections, and a channel engine configured to generate capacitance values corresponding to the unit cells.

8 Claims, 9 Drawing Sheets

(56) References Cited

U.S. PATENT DOCUMENTS

| | | | |
|---|---|---|---|
| 8,729,911 B2* | 5/2014 | Maharyta | G06F 3/044 324/658 |
| 8,779,783 B1 | 7/2014 | Liepold et al. | |
| 9,013,195 B2 | 4/2015 | Kremin et al. | |
| 9,354,751 B2 | 5/2016 | Fisher et al. | |
| 9,377,905 B1* | 6/2016 | Grivna | G06F 3/044 |
| 9,465,429 B2 | 10/2016 | Kitchens et al. | |
| 9,477,870 B2 | 10/2016 | Franza et al. | |
| 9,542,588 B2* | 1/2017 | Kremin | G06K 9/0002 |
| 9,639,733 B2* | 5/2017 | Kremin | G06K 9/0002 |
| 9,864,894 B2* | 1/2018 | Kremin | G06K 9/0002 |
| 10,013,593 B2* | 7/2018 | Kravets | G06F 3/044 |
| 2008/0158167 A1* | 7/2008 | Hotelling | G06F 3/0416 345/173 |
| 2010/0315375 A1* | 12/2010 | Yang | G06F 3/0412 345/174 |
| 2011/0025629 A1* | 2/2011 | Grivna | G06F 3/0416 345/173 |
| 2012/0026131 A1* | 2/2012 | Bytheway | G06F 3/0418 345/174 |
| 2013/0057480 A1* | 3/2013 | Brunet | G06F 3/0416 345/173 |
| 2013/0207926 A1* | 8/2013 | Kremin | G06F 3/0383 345/174 |
| 2013/0241868 A1* | 9/2013 | Kim | G09G 3/3685 345/174 |
| 2013/0271422 A1 | 10/2013 | Hotelling et al. | |
| 2013/0321323 A1* | 12/2013 | Salaverry | G06F 3/044 345/174 |
| 2014/0022211 A1* | 1/2014 | Karpin | G06F 3/044 345/174 |
| 2014/0111464 A1 | 4/2014 | Bakken et al. | |
| 2014/0253492 A1 | 9/2014 | Maharyta et al. | |
| 2014/0313159 A1 | 10/2014 | Wilson et al. | |
| 2014/0362036 A1 | 12/2014 | Mo et al. | |
| 2015/0062062 A1* | 3/2015 | Han | G06F 3/0412 345/174 |
| 2015/0248177 A1* | 9/2015 | Maharyta | G06F 3/044 345/174 |
| 2016/0140376 A1* | 5/2016 | Kremin | G06K 9/0002 382/124 |
| 2016/0148034 A1* | 5/2016 | Kremin | G06K 9/0002 382/124 |
| 2016/0267313 A1 | 9/2016 | Pope et al. | |
| 2016/0350577 A1 | 12/2016 | Yang et al. | |
| 2017/0068838 A1* | 3/2017 | Kravets | G06F 3/044 |
| 2017/0177920 A1* | 6/2017 | Kremin | G06K 9/0002 |
| 2017/0323136 A1* | 11/2017 | Zhan | G06F 3/044 |
| 2017/0351897 A1* | 12/2017 | Kremin | G06K 9/0002 |
| 2018/0032780 A1* | 2/2018 | Li | G06K 9/0002 |
| 2018/0164915 A1* | 6/2018 | Karpin | G06F 3/044 |
| 2018/0260071 A1* | 9/2018 | Kim | G06F 3/0412 |
| 2018/0260600 A1* | 9/2018 | Kremin | G06K 9/0002 |

OTHER PUBLICATIONS

International Search Report for International Application No. PCT/US17/48833 dated Dec. 26, 2017; 4 pages.

Written Opinion for the International Searching Authority for International Application No. PCT/US17/48833 dated Dec. 26, 2017; 6 pages.

* cited by examiner

CAPACITIVE SENSING WITH MULTI-PATTERN SCAN

RELATED APPLICATIONS

This patent application claims the benefit of U.S. Provisional Patent Application No. 62/434,099, filed Dec. 14, 2016, which is incorporated by reference herein, in its entirety.

TECHNICAL FIELD

This disclosure relates generally to electronic systems, and, more particularly, to capacitance sensing and touch detection.

BACKGROUND

Capacitance sensing systems can sense electrical signals generated on electrodes that reflect changes in capacitance. Such changes in capacitance can indicate a touch event or the presence of ridges and valleys of a fingerprint. Touch sensing may be used for applications on a variety of user interface devices, such as mobile handsets, personal computers, and tablets. The use of capacitance sensing for touch detection may allow for a touch sensor (also referred to herein as an electrode, a sensor, etc.) to be placed in or under the surface of a user interface device with a great degree of configurability. In one embodiment, a touch sensor may not be specific to a single location for all devices. Rather, touch sensors may be disposed where convenient to the industrial design of the device.

Capacitance-based touch sensors work by measuring the capacitance of a capacitive sense element and sensing a change in capacitance indicating a presence or absence of an object (e.g., a finger or a ridge or valley of a fingerprint). When an object comes into contact with, or is in close proximity to a touch sensor, the capacitance change caused by the object is detected. The capacitance change of the touch sensor can be measured by an electrical circuit and converted into a digital capacitance value.

DESCRIPTION OF THE DRAWINGS

The present disclosure is illustrated by way of example, and not by way of limitation, in the figures of the accompanying drawings.

DETAILED DESCRIPTION

Figure 1:
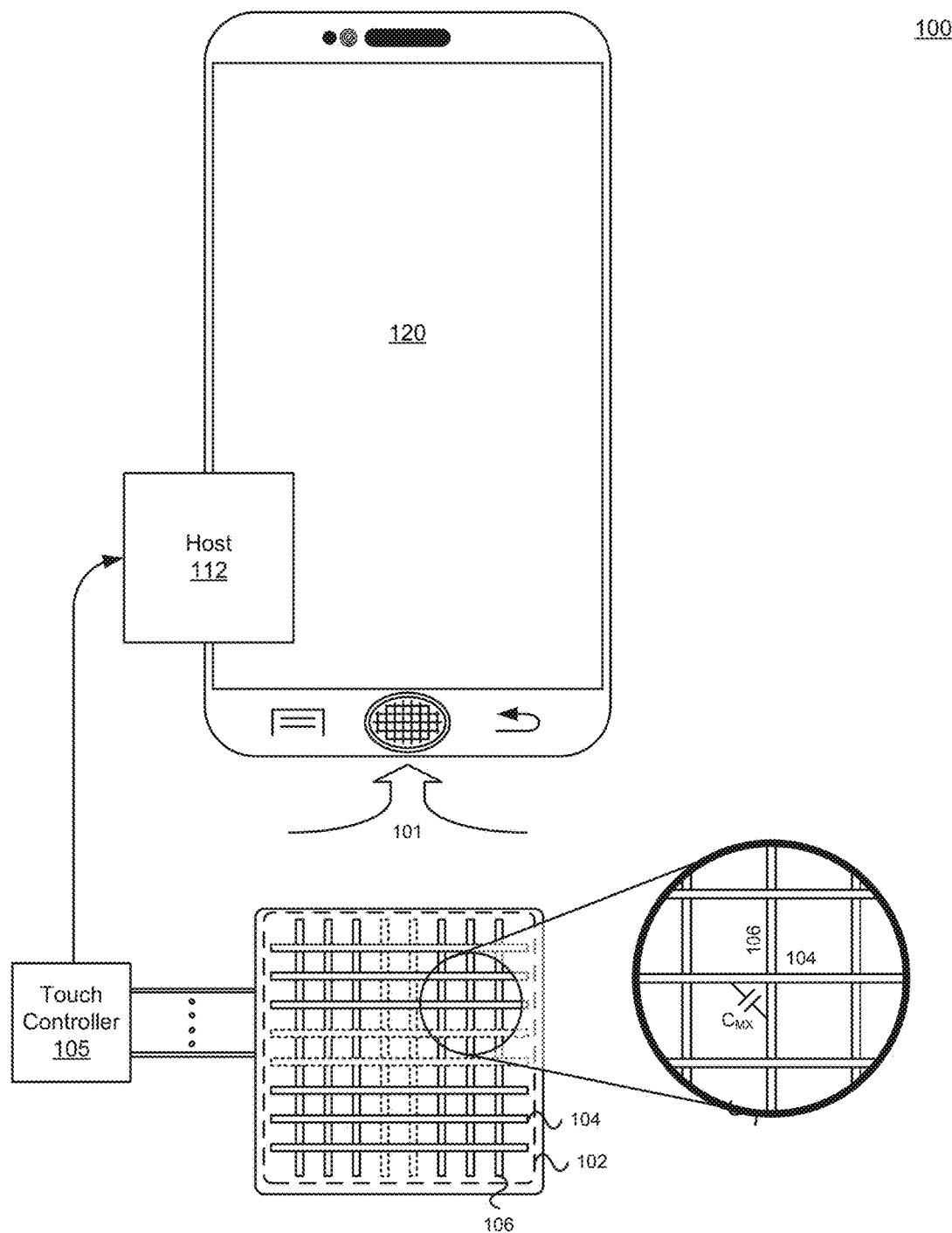
FIG. 1 illustrates a system including a touch detection circuit, according to one embodiment.

In the following description, for purposes of explanation, numerous specific details are set forth in order to provide a thorough understanding of the embodiments of the present invention discussed herein. It will be evident, however, to one skilled in the art that these and other embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

For simplicity and clarity of illustration, reference numerals may be repeated among the figures to indicate corresponding or analogous elements. Numerous details are set forth to provide an understanding of the embodiments described herein. The examples may be practiced without these details. In other instances, well-known methods, procedures, and components are not described in detail to avoid obscuring the examples described. The description is not to be considered as limited to the scope of the examples described herein.

In one embodiment, capacitive touch sensors detect very small signals through thicker and thicker overlays that may result in signal degradation. To operate under thick-overlays or support thick gloves and high-distance hover detection (e.g., detection of an object hovering above the overlay), capacitive systems may benefit from higher signal to noise ratios. In one embodiment, a single-pixel scan method (driving a single transmit electrode (TX) and sensing a single receive electrode (RX)) provides cell mutual capacitance (Cm) of a single TX and single RX electrode intersection. In one embodiment, intersections are formed by the physical overlay of one electrode over another (e.g., diagonally, perpendicularly, etc.) In one embodiment, in a single-pixel scan, a single intersection and the surrounding area may be thought of as a unit cell. Single-pixel scans may experience a low signal-to-noise ratio if touches are to be detected under certain conditions (e.g., under thick glass, through gloves, etc.). As described herein, in another embodiment, multiple TX and RX electrodes may be selected (driven and sensed, respectively) concurrently to produce a higher signal to noise ratio by effectively increasing the size of a unit cell to include more than one intersection. Concurrently selecting grouped (e.g., sets of) electrodes may result in bigger mutual capacitances and better sensitivity to touch with a scan time that is proportional to that of single-pixel scans. For example, if two TX electrodes and two RX electrodes are grouped (concurrently selected), the resulting Cm of the larger unit cell (e.g., including four intersections) may be approximately four times the Cm of a smaller unit cell of a single TX and RX intersection.

It should be noted that the operations described herein may be equally applied to self-capacitance (absolute capacitance) and mutual-capacitance touch detection systems. In one embodiment, in a self-capacitance system an object (e.g., a finger) on a single sensor increases the parasitic capacitance of the sensor relative to ground. In another embodiment, in a mutual capacitance system, the object alters the mutual capacitive coupling between row and column electrodes (TX and RX electrodes) which may be scanned sequentially.

FIG. 1 illustrates a system 100 with a touch detection circuit 101, touch controller 105, host 112, and device 120. Touch detection circuit 101 may include a number of electrodes arranged in an array 102 of row electrodes 104 and column electrodes 106, each coupled to a touch controller 105. FIG. 1 illustrates eight row electrodes 104 and eight column electrodes 106, but there may be considerably more electrodes disposed along both axes. Depending on the size of the array, there may be dozens or hundreds of electrodes for each axis (row and column). The pitch of row electrodes 104 and column electrodes 106 may be small enough such that multiple rows or columns may be disposed within a space between ridges of a fingerprint or along a ridge of the fingerprint when a finger is in contact with array 102. The exact size and pitch of the electrodes may depend on the system design requirements.

Row electrodes 104 and column electrodes 106 may be disposed such that a mutual capacitance, $C_{MX}$, is formed between them. A value of $C_{MX}$ may then correspond to each unit cell of array 102. In one embodiment, a unit cell is a capacitance sensor. As applied to capacitance sensors, the repeated pattern of a unit cell may define the resolution of the sensor. Unit cells may correspond to discrete locations on an array of electrodes. In one embodiment, every point within a unit cell is closer to the center of the unit cell than any other unit cell. In one embodiment of multi-pattern scan, unit cells include multiple intersections. For example, a unit cell that includes four intersections may include the intersections formed by two row electrodes 104 and two column electrodes 106.

In the example of FIG. 1, a total of 64 intersections are illustrated. In an array with 75 row electrodes and 125 column electrodes, there may be 9,375 intersections. Electrodes (columns and rows) with dashed lines indicate that considerably more columns or rows may be disposed along either axis. While only eight electrodes (row electrodes 104 and column electrodes 106) are illustrated, this is merely for simplicity of description. One of ordinary skill in the art would understand that columns and rows that are dashed represent dozens or even hundreds of electrodes. The calculated values of $C_{MX}$ (or digital values representative of mutual capacitance $C_{MX}$) may be used by touch controller 105 or a host 112 to detect a touch or the presence of a ridge or valley of a fingerprint.

Figure 2:
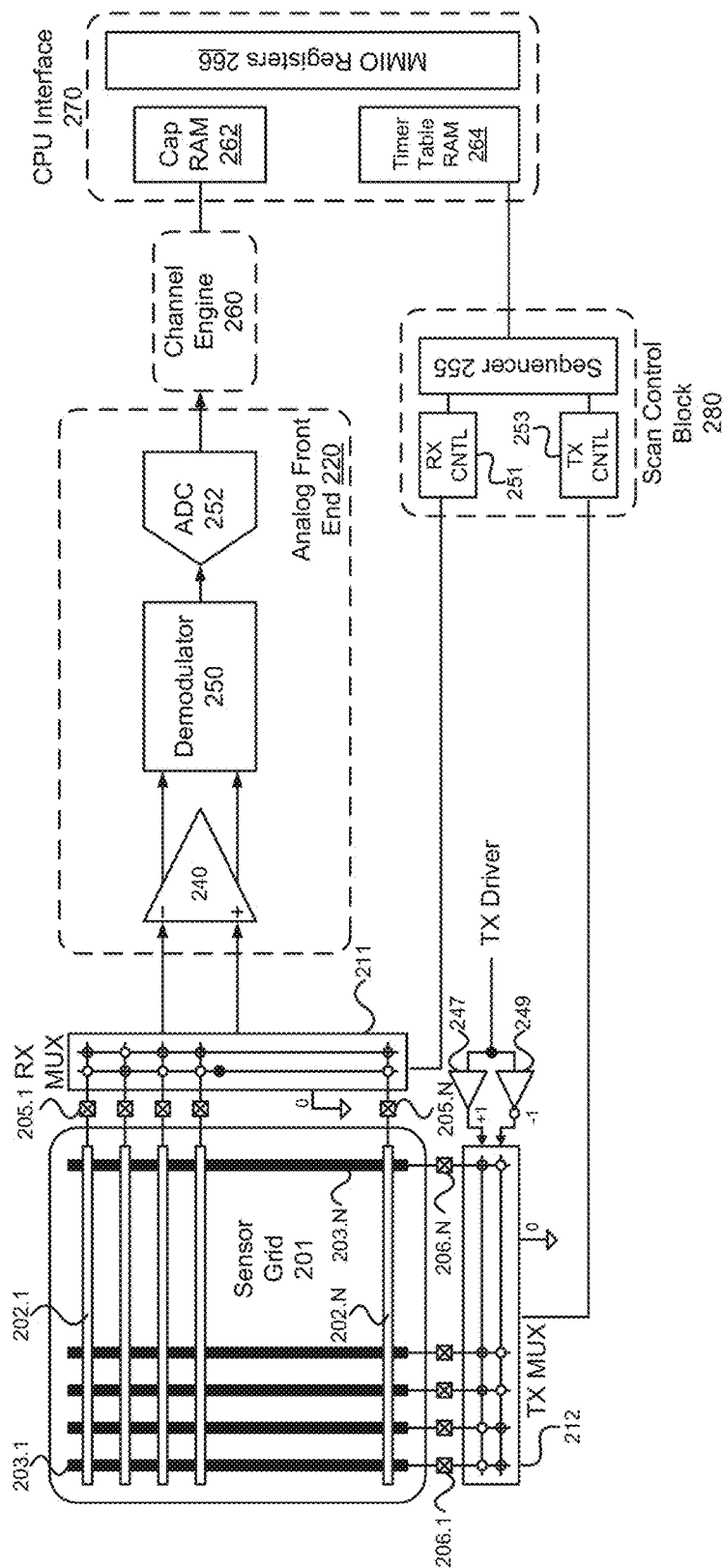
FIG. 2 illustrates a touch detection circuit, according to one embodiment.

FIG. 2 illustrates a touch detection circuit 200, according to one embodiment. Sensor grid 201 may be comprised of a plurality of row electrodes 202.1-202.N disposed along a first axis and a plurality of column electrodes 203.1-203.N disposed along a second axis. In one embodiment, the row and column electrodes may be bar-shaped and disposed on a substrate. A mutual capacitance may exist between each row electrode and each column electrode at the intersection between the row and column. As described above, this mutual capacitance may be conceptualized as a unit cell which can be measured and assigned a specific identification and capacitance value. Here, row electrodes 202.1-202.N and column electrodes 203.1-203.N are shown as simple bars. In other embodiments, they may be composed of more complex shapes, such as diamonds daisy-chained together to form rows and columns. Row electrodes 202.1-202.N and column electrodes 203.1-203.N may include multiple electrodes coupled together at one end or both ends.

Row electrodes 202.1-202.N may be coupled to RX pins 205.1-205.N and column electrodes 203.1-203.N may be coupled to TX pins 206.1-206.N. RX pins 205.1-205.N and TX pins 206.1-206.N may be part of an integrated circuit and may be coupled to an RX multiplexer (RX MUX) 211 or to a TX multiplexor (TX MUX) 212 via multiple channels (e.g., inputs) or the same channel. RX MUX 211 and TX MUX 212 may be configured to route signals to and from measurement circuitry to the row and column electrodes through the pins. For example, RX MUX 211 and TX MUX 212 may be configured to concurrently select (e.g., drive to or sense from) multiple (e.g., electrically grouped) electrodes simultaneously. In one embodiment, RX pins 205.1-205.N may be coupled to analog front end (AFE) 220 configured to convert the mutual capacitance between rows and columns to at least one digital value. AFE 220 may include a low noise amplifier (LNA) 240 coupled to row electrodes 202.1-202.N via RX MUX 211. In one embodiment, RX MUX 211 may be configured to couple a single row electrode to the inputs of LNA 240 at a time. In another embodiment, multiple row electrodes (e.g., RX electrodes) may be coupled to the inputs of LNA 240 (e.g., the inputs of the AFE 220) simultaneously. In still another embodiment, multiple LNAs may be coupled to RX MUX 211 to allow for individual and simultaneous measurement and the processing of multiple capacitances corresponding to multiple RX electrodes concurrently, each on a different channel of the AFE 220, to produce an output for each electrode. In still another embodiment, RX MUX 211 may include several smaller multiplexors, either in parallel or in series, with various input and output configurations. In one embodiment, a non-square sensor matrix may include a different number of RX and TX electrodes.

In one embodiment, RX MUX 211 may couple RX pins 205.1-205.N to band pass filter (BPF) to provide a differential input to LNA 240. In one embodiment, a BPF may remove off-band noise components injected by a finger or other conductive object or originating from other sources coupled to different components of a system. In one embodiment, the BPF may be a passive filter, such as an LC filter. In other embodiments, the BPF may be an active filter, which in certain embodiments may be based on a gyrator or other active components. In various embodiments, the BPF may be constructed using external components, integrated into a sensing circuit with internal circuit elements, or some combination of external components and internal resources.

The output of the BPF may be coupled to positive and negative inputs of LNA 240. In one embodiment, the output of the BPF may be coupled to input pins, thus coupling AFE 220 to an external BPF.

In one embodiment, the output of LNA 240 may be coupled to a demodulation circuit ("demodulator") 250, which provides an analog signal to analog-to-digital converter (ADC) 252. Demodulator 250 may receive a pair of phase-shifted clocks and demodulate the signal from the LNA 240 into two components: I ("in-phase") and Q ("quadrature phase"). The I and the Q phase may be either differential or single-ended, depending on the amplifier implementation.

The I and Q phase may be either differential or single-ended, depending on the amplifier implementation. The demodulator modifies the input signal by multiplying or mixing the pair of quadrature-shifted (0° and 90°) demodulator reference signals. A differential input demodulator may use a pair of differential quadrature reference phase-shifted signals (0°-180°, 90°-270°) for I and Q channels, respectively.

In one embodiment, the analog signal generated by demodulator 250 is received by ADC 252, which may convert the analog signal (voltage) from demodulator 250 to a digital value. The output digital value of ADC 252 may function as the output of AFE 220. The output of AFE 220 may be coupled to a channel engine 260. Channel engine 260 may include logic to square each of the quadrature component outputs of the AFE. Channel engine 260 may include summing logic to combine the squared values of the quadrature component outputs of AFE 220. Finally, channel engine 260 may include root logic for calculating the square root of the summed, squared quadrature component outputs of AFE 220. The output of channel engine 260 may be a result, R, which may be given by Equation 2:

$$R = \Sigma_{n=0}^{N} (\sqrt{I_n^2 + Q_n^2}), \tag{1}$$

where n is the ADC sample number and N is the total number of accumulated ADC samples. The output of channel engine 260 may not depend on the input signal phase, which may eliminate the need for complex calibration steps.

In various embodiments, channel engine 260 may complete additional functions, including but not limited to calculation of minimum and/or maximum capacitance values, calculation of minimum and/or maximum capacitance change values, RMS calculation, and baseline calculation and update, offset subtraction, and scaling of accumulated results.

The output (a capacitance value) of channel engine 260 may be passed to a memory, such as a capacitance value storage memory (Cap RAM) 262, which may be part of a CPU interface 270. CPU interface 270 may also include MMIO registers 266 to program sequencer 255 by CPU interface 270 (e.g, setting number of TX pulses per pixel) and a Timer Table memory (Timer Table RAM) 264 to program timing for all sequencer control signals (e.g. input tank reset duration prior scanning cycle starts). Timer Table RAM 264 may include an output that is passed to a scan control block 280.

Scan control block 280 may include an RX control block 251 and a TX control block 253, both coupled to sequencer 255. Scan control block 280 may cause RX MUX 211 and/or TX MUX 212 to electrically couple sets of RX electrodes, and sets of TX electrodes, respectively. The outputs of RX control block 251 and TX control block 253 may be coupled to RX MUX 211 and TX MUX 212, respectively. The control of TX MUX 212 may drive a signal (e.g., a TX signal) to the column electrodes 203.1-203.N (e.g., drive the TX electrodes). The TX signal may be generated from amplifiers (e.g., drivers) 247 and 249. In one embodiment, amplifiers 247 and 249 and TX MUX 212 may be configured to provide a differential TX signal to column electrodes 203.1-203.N. In another embodiment, a single TX signal may be applied, thus providing a non-differential signal to the column electrodes 203.1-203.N.

Figure 3A:
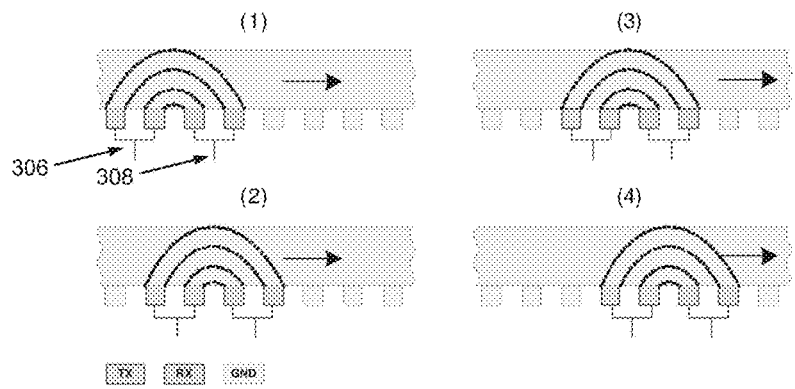
FIG. 3A illustrates a first multi-pattern scan of a touch detection circuit, according to one embodiment.

FIG. 3A illustrates a first multi-pattern scan of a touch detection circuit, according to one embodiment. In one embodiment, virtual sense electrode (e.g., a virtual sense electrode larger than a single electrode) may be formed by grouping multiple individual sense electrodes together dynamically (e.g., groups 306 and 308). Scanning may be performed by moving the virtual sense electrode across the touch sensing panel, as illustrated. In one embodiment, the resolution (e.g., pitch) of a scan may be modified by grouping different numbers of electrodes together to form a virtual sense electrode and by overlapping or not overlapping electrodes in sequential scans.

Figure 3B:
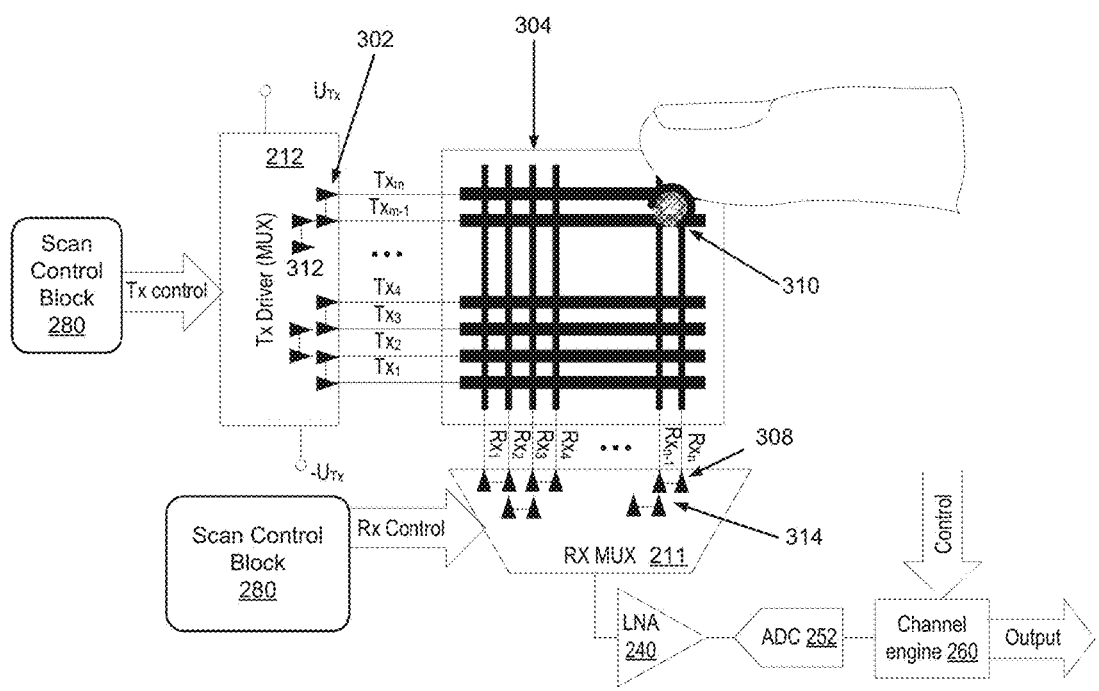
FIG. 3B illustrates a second multi-pattern scan of a touch detection circuit, according to one embodiment.

FIG. 3B illustrates a second multi-pattern scan of a touch detection circuit, according to one embodiment. In one embodiment, scan control block 280 enables TX MUX 212 to concurrently drive two or more grouped TX electrodes 302 of a touch panel of electrodes 304 in a first scan. RX MUX 211 may concurrently sense signals from multiple grouped RX electrodes 308 in response to concurrently driving the TX electrodes. LNA 240, ADC 252 and channel engine 260 may determine a capacitance for a unit cell (e.g., unit cell 310) of the touch panel of electrodes 304, as described above. The unit cell may include multiple intersections (e.g., the four intersections formed by TX electrodes 302 and RX electrodes 308).

In a second scan, scan control block 280 may enable TX MUX 212 to concurrently drive a second group of two or more TX electrodes 312 of the touch panel of electrodes 304. RX MUX 211 may also concurrently sense signals from a second group of multiple RX electrodes 314 in response to concurrently driving the TX electrodes. LNA 240, ADC 252 and channel engine 260 may determine a second capacitance for a second unit cell of the touch panel of electrodes 304. The second unit cell may include multiple intersections (e.g., the four intersections formed by TX electrodes 312 and RX electrodes 314). In one embodiment, the output of channel engine 260 may be sent to a fingerprint controller to detect the presence of a ridge or a valley of a fingerprint on the touch panel of electrodes 304 based on the capacitance value (e.g., output of channel engine 260).

By concurrently driving various groups of TX electrodes and concurrently sensing signals from various groups of RX electrodes, capacitance values for variously sized unit cells may be determined. The resolution with which touch panel of electrodes 304 captures capacitance values may depend on how many TX electrodes and driven concurrently and how many RX electrode signals are received concurrently. In various embodiments, the number of TX and RX electrodes concurrently selected may be adjusted (e.g., by scan control block 280) to configure the resolution of a scan. In embodiments where a low resolution and fast scanning time may be desired, more TX and RX electrodes may be selected concurrently (thus increasing the size of the unit cell). In another embodiment, where a high resolution and slower scanning time may be desired, less TX and RX electrodes may be selected concurrently (thus decreasing the size of the unit cell). In one embodiment, the number of TX electrodes that are concurrently selected and the number of RX electrodes that are concurrently selected may be different. In another embodiment the number of TX electrodes that are concurrently selected and the number of RX electrodes that are concurrently selected may be the same.

Figure 4A:
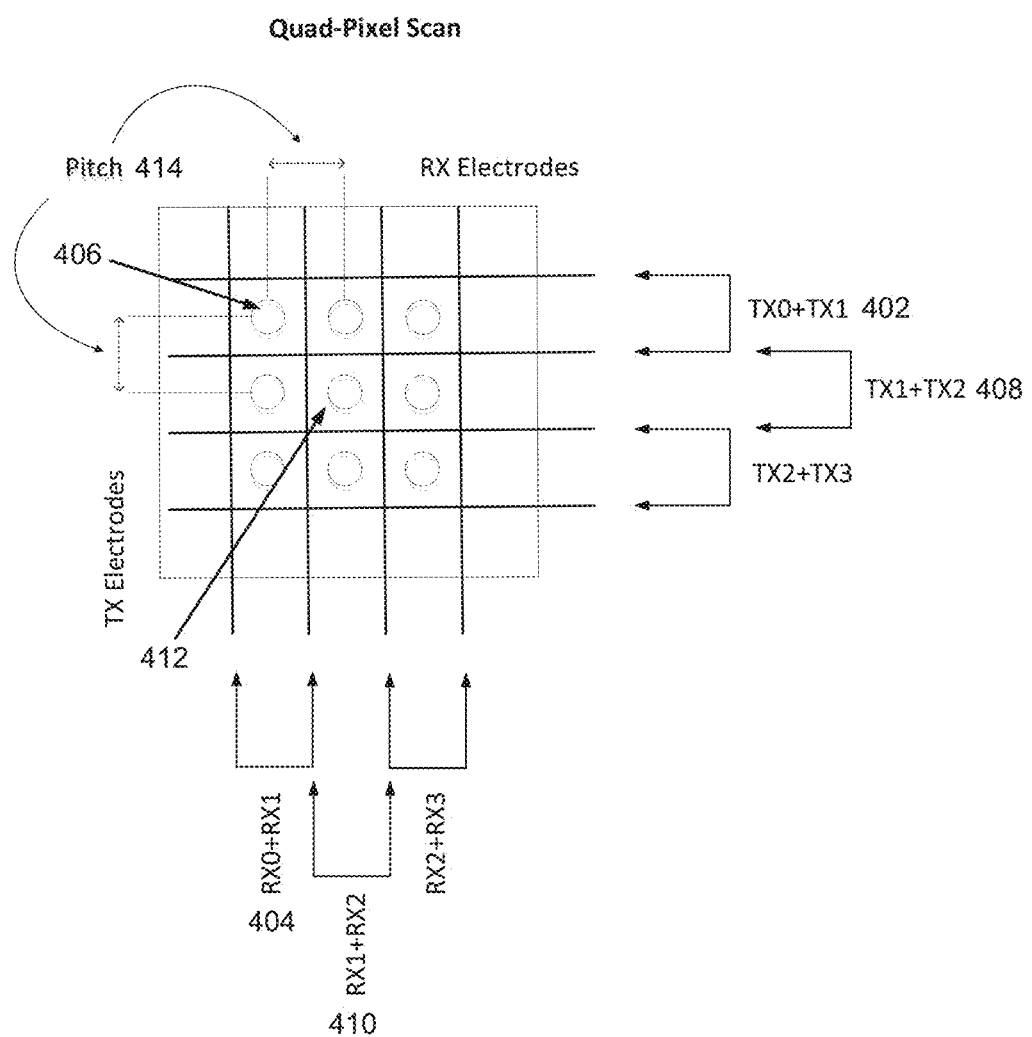
FIG. 4A illustrates a third multi-pattern scan of a touch detection circuit, according to one embodiment.

FIG. 4A illustrates a second multi-pattern scan of a touch detection circuit, according to one embodiment. As shown in FIG. 4A, a first set of TX electrodes 402 may be driven concurrently and signals from a first set of RX electrodes 404 may be received concurrently. Capacitance values for the four intersections of the TX electrodes 402 and the RX electrodes 404 may be calculated. In one embodiment, the capacitance values may be averaged to determine a capacitance of a unit cell 406 that includes the intersections.

In one embodiment, a second scan may be performed by concurrently driving a second set of TX electrodes 408 and concurrently receiving signals from a second set of RC electrodes 410. Capacitance values for the four intersections of the TX electrodes 408 and the RX electrodes 410 may be calculated. In one embodiment, the capacitance values may be averaged to determine a capacitance of a second unit cell 412 that includes the intersections for 408 and 410. In one embodiment, the resolution of the scan depends on the pitch 414 of the unit cells. The larger the pitch (e.g., the distance between the centers of unit cells), the larger the unit cells and the lower the resolution of the scan. In one embodiment, sequential scans may include overlapping electrodes, resulting in smaller unit cells and a slower scan with a high resolution. In another embodiment, scans may skip electrodes (resulting in larger unit cells) to perform a faster scan with lower resolution. In one embodiment, different numbers of TX and RX electrodes may be activated concurrently (e.g., two RX electrodes and one TX electrode, two TX electrodes and one RX electrode, one RX electrode and three TX electrodes, etc.) in various scan modes.

Figure 4B:
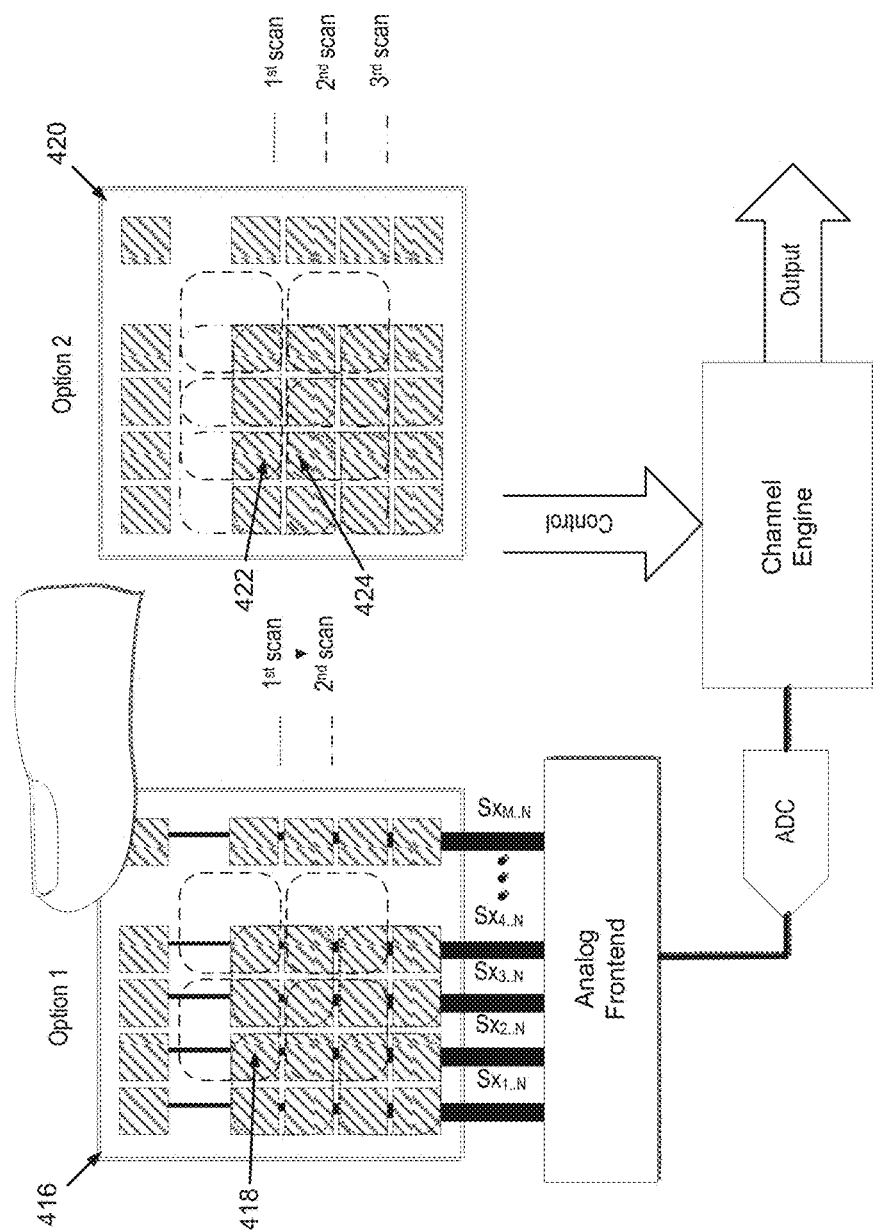
FIG. 4B illustrates a fourth multi-pattern scan of a touch detection circuit, according to one embodiment.

FIG. 4B illustrates a fourth multi-pattern scan of a touch detection circuit, according to one embodiment. In one embodiment, various configurations of overlapping scans can provide a different sensor resolution (e.g., which may results in different resulting image resolutions). For example, in a first scan option 416, a first scan and a second scan may be performed by overlapping a single electrode 418 in each sequential scan. In another example, in a second scan option 420, a first scan and a second scan may be performed by overlapping two electrodes 422 and 424 in each sequential scan. In one embodiment, additional scans may be performed to increase the resolution of the image formed by the scans.

Figure 5:
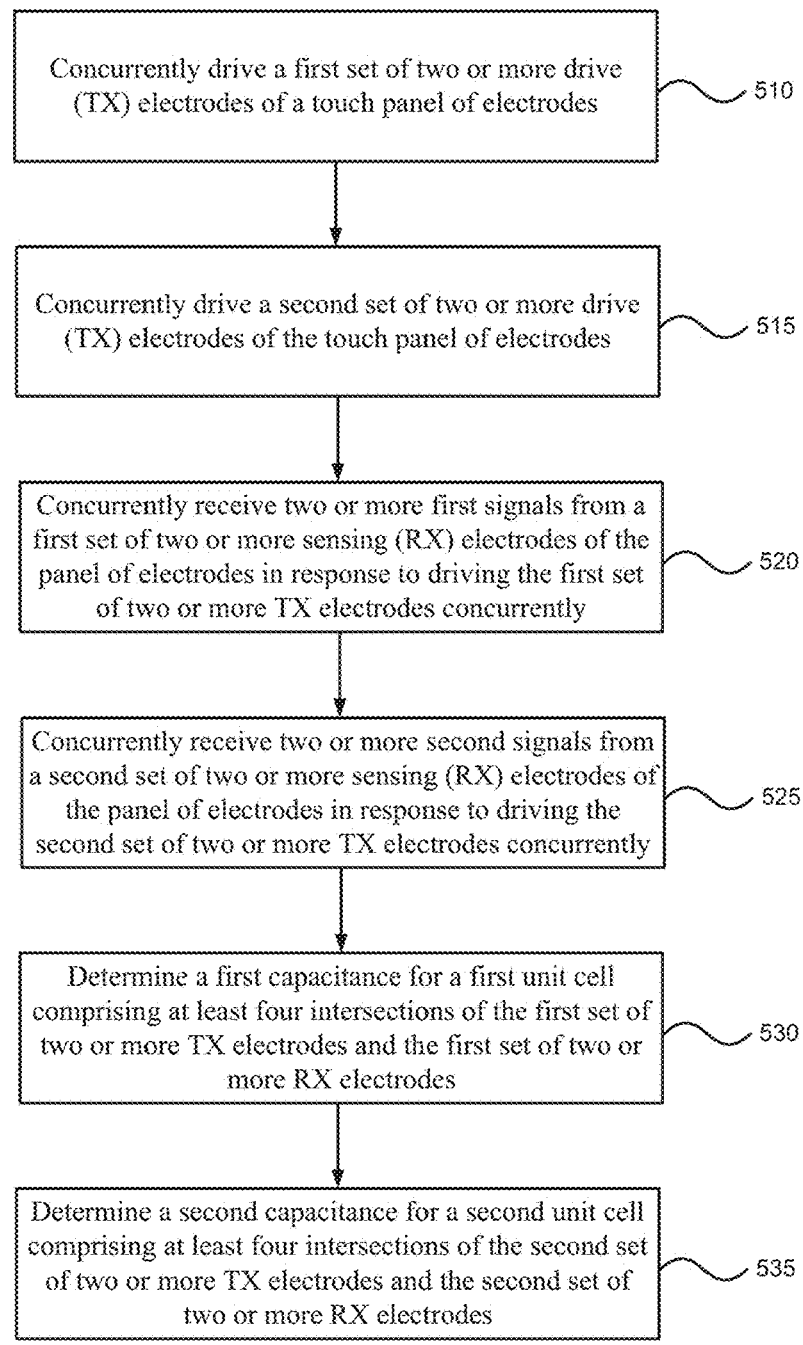
FIG. 5 illustrates a method for multi-pattern scanning, according to one embodiment.

FIG. 5 illustrates a method 500 for multi-pattern scanning, according to one embodiment. The processing flow method 500 may be performed by processing logic that comprises hardware (e.g., circuitry, dedicated logic, programmable logic, microcode, etc.), software (e.g., instructions run on a processing device to perform hardware simulation), or a combination thereof. Method 500 can provide operations for an analog frond (e.g., analog front end 220 of FIG. 2). Method 500 may be performed in any order so as to fit the needs of the functionality to be provided.

At block 510 of method 500, processing logic concurrently drives a first set of two or more drive (TX) electrodes of a touch panel of electrodes. In another embodiment, a single TX electrode may be driven at a time. In one embodiment, to drive the TX electrodes, processing logic may induce a square wave on electrode channels connected to the TX electrodes. At block 515, processing logic concurrently drives a second set of two or more drive (TX) electrodes of the touch panel of electrodes. At block 520, processing logic concurrently receives two or more signals (e.g., two or more first signals) from a first set of two or more sensing (RX) electrodes of the panel of electrodes in response to driving the first set of two or more TX electrodes concurrently. In another embodiment, a single signal corresponding to a single RX electrode may be received at a time. At block 525, processing logic concurrently receives two or more signals (e.g., two or more second signals) from a second set of two or more sensing (RX) electrodes of the panel of electrodes in response to driving the second set of two or more TX electrodes concurrently. Processing logic at block 530 may then determine a first capacitance for a first unit cell including at least four intersections of the first set of two or more TX electrodes and the first set of two or more RX electrodes. At block 535, processing logic may determine a second capacitance for a second unit cell including at least four intersections of the second set of two or more TX electrodes and the second set of two or more RX electrodes. In one embodiment, the at least four intersections of the second unit cell include at least two intersections of the first unit cell.

Processing logic may continue to concurrently scan additional electrodes of the touch sensing to determine additional capacitance values of unit cells of the touch panel of electrodes. For example, processing logic may concurrently drive a second set of two or more TX electrodes and concurrently receive two or more signals (e.g. two or more second signals) from a second set of two or more RX electrodes of the panel of electrodes in response to driving the second set of two or more TX electrodes concurrently. In one embodiment, a TX MUX may control the concurrent selection (e.g., driving) of various TX electrodes and an RX MUX may control the concurrent selection (e.g., sensing) of various RX electrodes. Processing logic may determine a second capacitance for a second unit cell comprising at least four intersections of the second set of two or more TX electrodes and the second set of two or more RX electrodes.

In a first scan mode, processing logic activates sequential overlapping sets of TX and RX electrodes in each scan (e.g., TX1 and TX2 with RX1 and RX2 concurrently, then TX2 and TX3 with RX2 and RX3 concurrently, etc.) so that the first unit cell and the second unit cell include at least one common intersection (e.g., the TX2 and RX2 intersection. In this case, the pitch of the scan (the distance between unit cells), and therefore the resolution of the scan, may be the same as the resolution of a scan of each intersection of the touch sensing array. In one embodiment, the unit cells of consecutive scans do not include any common intersections.

In other scan modes, processing logic may activate non-sequential, non-overlapping sets of TX and RX electrodes in each scan (e.g., TX1 and TX2 with RX1 and RX2 concurrently, then TX3 and TX4 with RX3 and RX4 concurrently, etc.) so that a second unit cell does not share any intersections a first unit cell. In this case, the pitch of the scan, and therefore the resolution of the scan, may be the half the resolution of a scan of each intersection of the touch sensing array. In one embodiment, the centers of the unit cells may be located on the first set of TX electrodes or the second set of TX electrodes.

In one embodiment, processing logic may store the first capacitance and the second capacitance in a memory and process the capacitances to determine a presence of a ridge or valley of a fingerprint on the touch sensing array. In one embodiment, to detect ridges and valleys, the electrodes of a touch sensing array may have a pitch of approximately 68 microns. In another embodiment, when ridges and valleys may not be detected, the touch sensing array may have a pitch of approximately 1 mm.

In one embodiment, to perform the multi-pattern scan method 500 on a touch panel of electrodes as described above, processing logic may initialize a TX electrode index (txIdx) and an RX electrode index (rxIdx) (e.g., to zero) to define a starting point (starting electrodes) of the scan. Processing logic may set a TX electrode offset value (txOffset) and an RX electrode offset value (rxOffset) that indicate a pitch (e.g., resolution) of the scan and connect a first set of sensors (e.g, RX(rxIdx), RX(rxIdx+1). Processing logic may concurrently drive a first set of TX electrodes (e.g., TX(txIdx+txOffset) and TX(txIdx+txOffset+1) and concurrently sense a first set of RX electrodes (e.g., RX(txIdx+rxOffset) and TX(txIdx+rxOffset+1), increasing rxOffset and txOffset after each scan. In one embodiment, processing logic may end the scan when the last RX or TX electrode of the touch panel of electrodes has been scanned (e.g. when rxIdx or txIdx are equal to or greater than a threshold).

Figure 6:
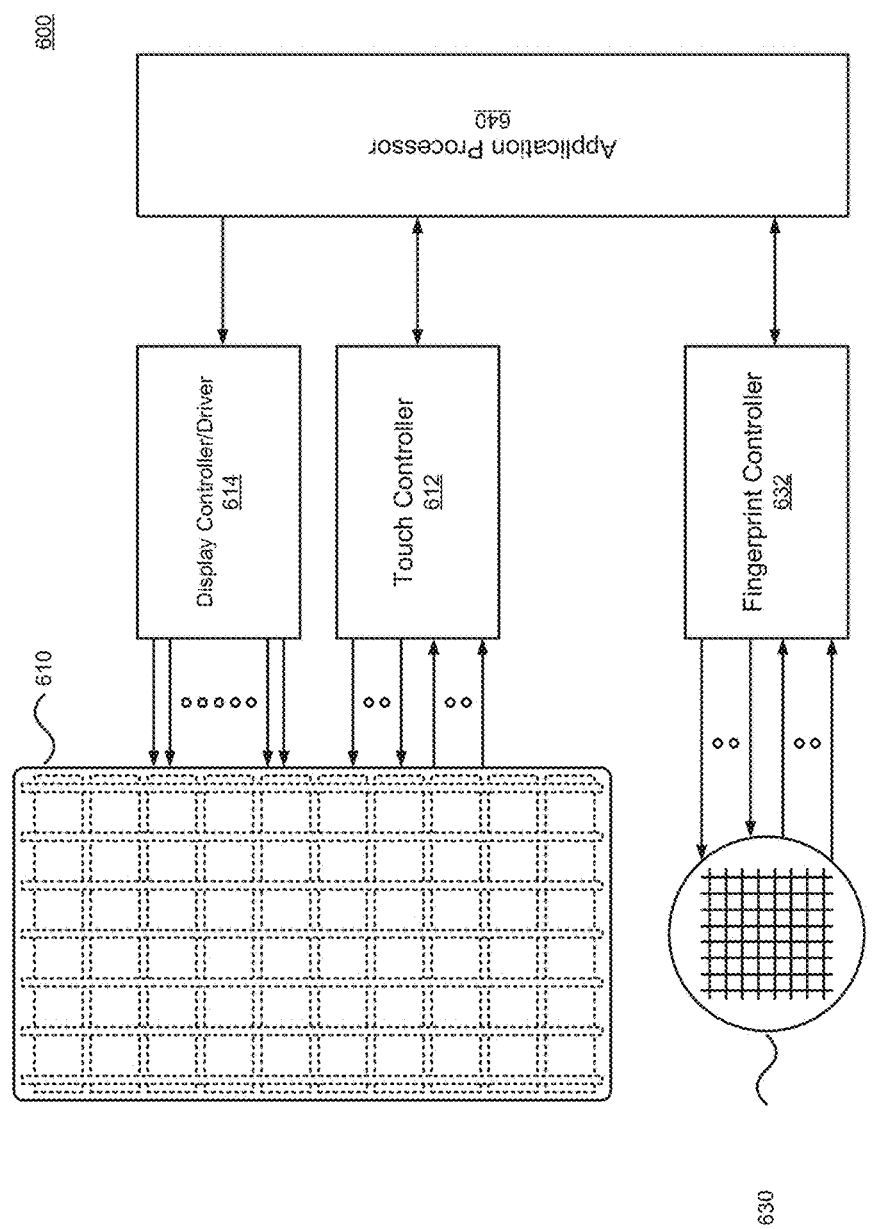
FIG. 6 illustrates a system including a touch sensor, according to one embodiment.

FIG. 6 illustrates one embodiment of a system 600 that includes a touch detection circuit similar to that described with regard to FIG. 1. A touchscreen display 610 may include a display unit, such as an LCD, and sensing electrodes disposed over the surface of the display to detect a user's finger. Display Controller/Driver 614 may be configured to control what is shown on touchscreen display 610. Touch controller 612 may be configured detect a user's finger using any commonly used sensing method. The output of the touch controller 612 may be communicated to an application processor 640, which may also communicate to display controller/driver 614. Touch controller 612 may also be configured to receive commands and data from application processor 640. Touch controller 612 may be configured to communicate with application processor 640 to provide touch detection functions to system 600. Fingerprint controller 632 may be configured to detect and distinguish fingerprints on fingerprint sensor 630.

Figure 7:
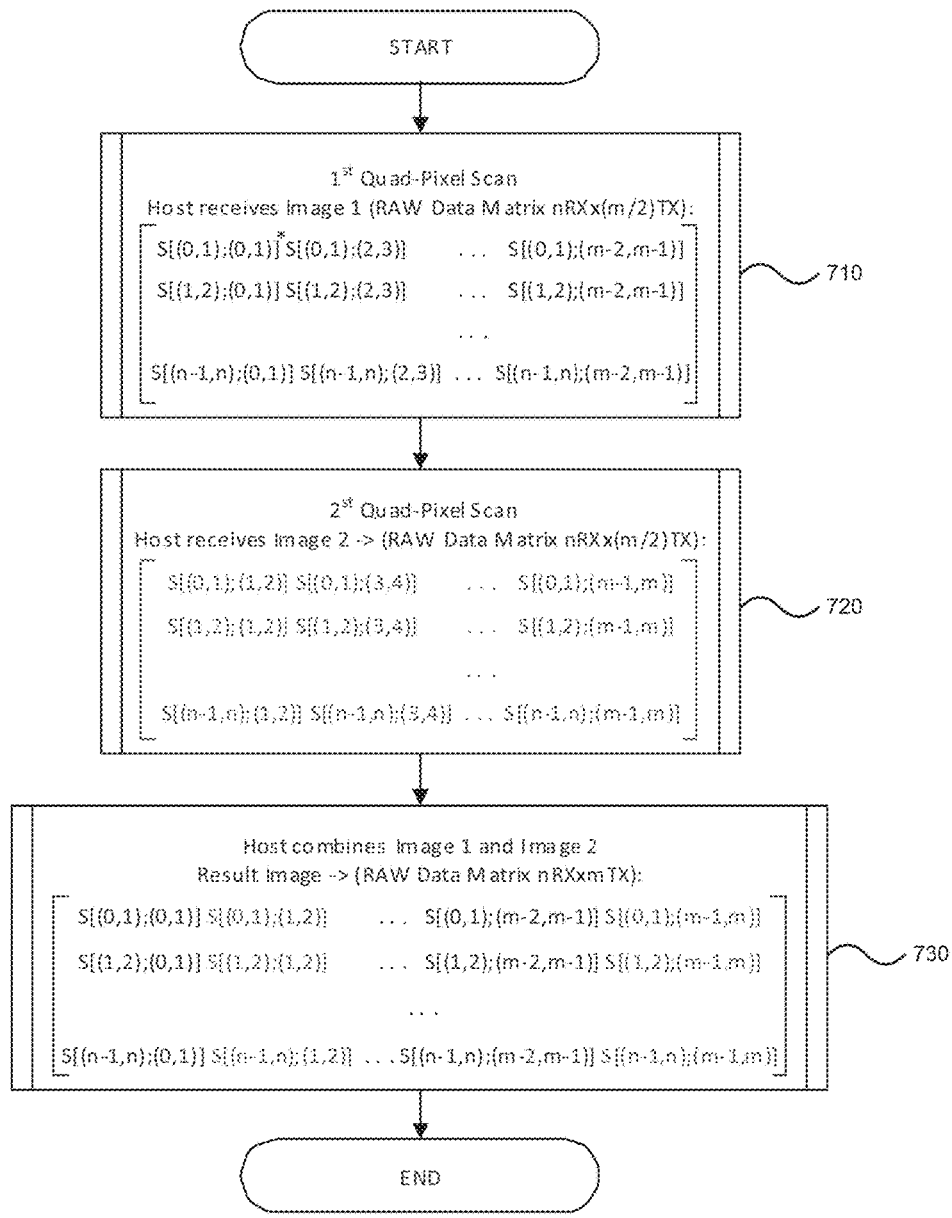
FIG. 7 illustrates a method for combining multi-pattern scan images, according to one embodiment.

FIG. 7 illustrates a method for combining multi-pattern scan images, according to one embodiment. The processing flow method 700 may be performed by processing logic that comprises hardware (e.g., circuitry, dedicated logic, programmable logic, microcode, etc.), software (e.g., instructions run on a processing device to perform hardware simulation), or a combination thereof. Method 700 can provide operations for a touch controller (e.g., touch controller 612 of FIG. 6), fingerprint controller (e.g., fingerprint controller 632 of FIG. 6), processing device (e.g., application processor 640 of FIG. 6), etc. Method 700 may be performed in any order so as to fit the needs of the functionality to be provided.

At block 710 of method 700, processing logic receives first data associated with the first scan (e.g., the first image). In one embodiment, the first data represents capacitance values for virtual electrodes scanned during the first scan. At block 720, processing logic receives second data associated with the second scan (e.g., the second image). In one embodiment, the second data represents capacitance values for virtual electrodes scanned during the second scan. In one embodiment, the first and second data represent two RAW data matrices including a signal for each quad-pixel intersection (e.g., S[(0,1); (1,2)] may represent a signal from the intersection of the (RX0+RX1) and (TX1+TX2) electrodes).

At block 730, processing logic combines the first data (e.g., the first image) and the second data (e.g., the second image) to generate a combined image. In one embodiment, to combine the first data and the second data (e.g., the first image and the second image) processing logic may combine the odd TX lines from the first image with the even TX lines from the second image.

In one embodiment, to generate the first image and the second image, RX electrodes are scanned in overlapping pairs (e.g., (RX0+RX1)→(RX1+RX2)→ . . . →(RX101+RX102)→(RX102+RX103)). In one embodiment, to generate the first image and the second image the TX electrodes are scanned in non-overlapping pairs. For example, for the first image: (TX0+TX1)→(TX2+TX3)→ . . . →(TX100+TX101)→(TX102+TX103) and for the second image: (TX1+TX2)→(TX3+TX4)→ . . . →(TX101+TX102)→(TX103+TX104). In one embodiment, the second image is generated by shifting the starting TX electrode of the first image by one TX electrode (e.g., the second image starts with TX1 and the first image starts with TX0).

Figure 8:
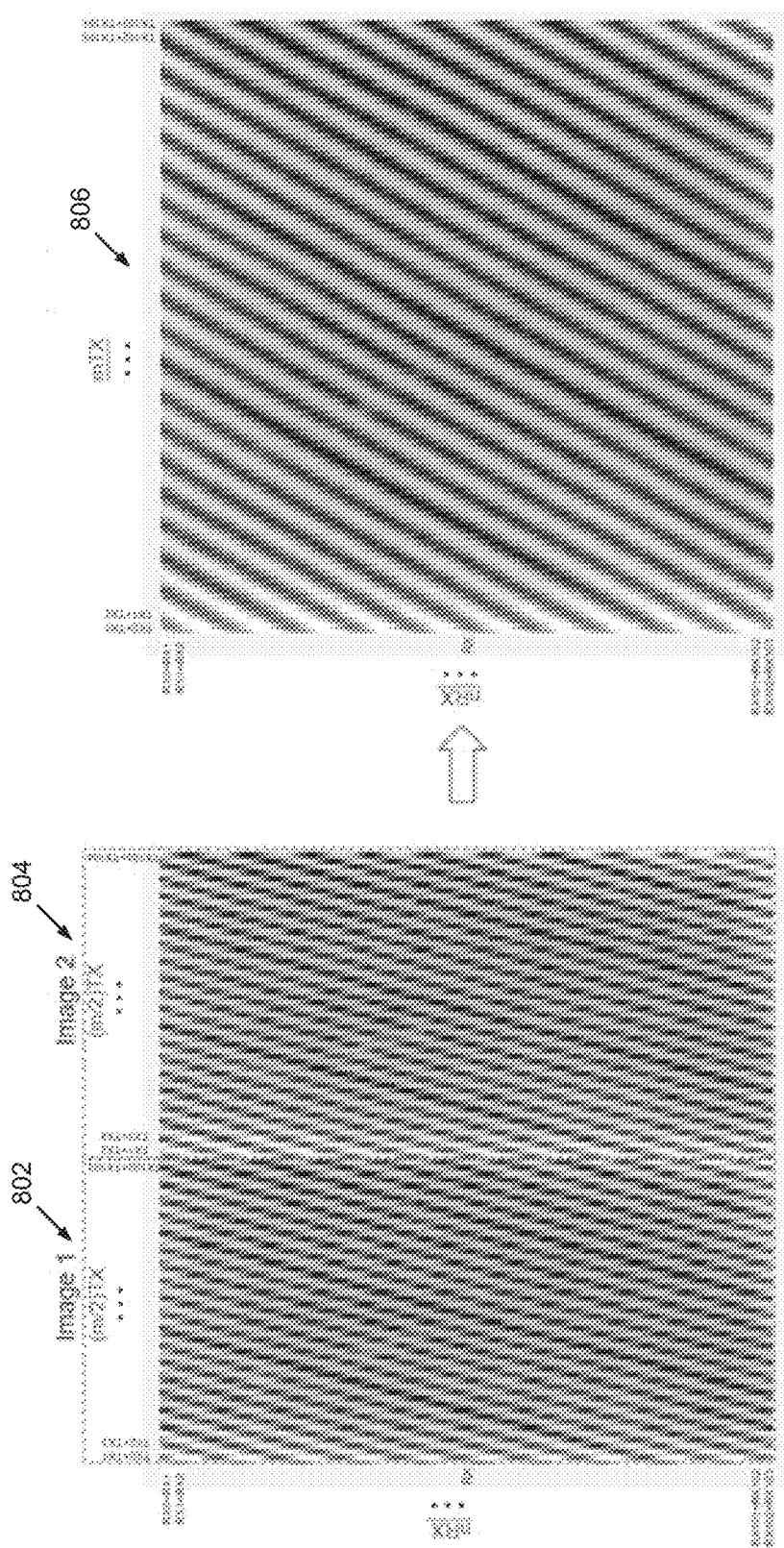
FIG. 8 illustrates multi-pattern scan images, according to one embodiment.

FIG. 8 illustrates multi-pattern scan images, according to one embodiment. As described above with respect to FIG. 7, a first image 802 and a second image 804 may be combined to generate a combined image 806. In one embodiment, the first image 802 and the second image 804 are the output of a first scan and a second scan of overlapping electrodes (e.g., virtual electrodes). The first image 802 and the second image 804 may be combined to generate a combined image 806 having the same resolution of a single pixel scan.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "integrating," "comparing," "balancing," "measuring," "performing," "accumulating," "controlling," "converting," "accumulating," "sampling," "storing," "coupling," "varying," "buffering," "applying," "driving," "activating," "receiving," "determining," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and circuits presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A sensing circuit comprising:
   a first input operatively coupled to a first set of two or more drive (TX) electrodes electrode;
   a first set of two or more inputs operatively coupled to a first set of two or more sensing (RX) electrodes, respectively, forming at least four intersections with the first set of two or more drive electrodes, the at least four intersections including a first intersection and a second intersection, wherein a first number of TX electrodes in the first set of two or more TX electrodes is different than a second number of RX electrodes in the first set of two or more RX electrodes;
   a second set of two or more inputs operatively coupled to a second set of two or more RX electrodes, respectively, forming the second intersection and a third intersection with the first set of two or more TX electrodes;
   a scan control circuit, operatively coupled to the first input, the first set of two or more inputs, and the second set of two or more inputs, to concurrently select the first set of two or more RX electrodes and to concurrently select the second set of two more RX electrodes via a multiplexer, cause the multiplexer to electrically couple the first set of two or more TX electrodes to concurrently drive a first signal on the two or more TX electrodes, and cause the multiplexor to electrically couple the first set of two or more RX electrodes to concurrently receive a second signal generated from a current induced on the first set of two or more RX electrodes in response to the first signal;
   an analog front end (AFE) configured to:
      generate a first digital value representative of a first mutual capacitance of a first unit cell, wherein the first unit cell comprises the first intersection and the second intersection; and
      generate a second digital value representative of a second mutual capacitance of a second unit cell, wherein the second unit cell comprises the second intersection and the third intersection;
   a channel engine, operatively coupled to the AFE, configured to generate a first capacitance value and a second capacitance value corresponding to the first unit cell and the second unit cell, respectively;
   a fingerprint controller that determines, based on a combined image, a presence of a ridge or valley of a fingerprint,
   wherein the combined image is generated based on a first image, which is generated based on the first capacitance value, and a second image, which is generated based on the second capacitance value, and
   wherein the combined image comprises:
      an odd pixel column comprising the first capacitance value; and
      an even pixel column, comprising the second capacitance value.

2. A method comprising:
   concurrently driving, by a processing device, a first set of two or more drive (TX) electrodes of a touch panel of electrodes;
   concurrently driving a second set of two or more TX electrodes of the touch panel;
   concurrently receiving two or more first signals from a first set of two or more sensing (RX) electrodes of the panel of electrodes in response to driving the first set of two or more TX electrodes concurrently;
   concurrently receiving two or more second signals from a second set of two or more RX electrodes of the panel of electrodes in response to driving the second set of two or more TX electrodes concurrently;
   determining, by the processing device, a first capacitance for a first unit cell comprising at least four intersections of the first set of two or more TX electrodes and the first set of two or more RX electrodes, the first capacitance is determined from a generated first digital value representative of the first capacitance for the first unit cell;

determining a second capacitance for a second unit cell comprising at least four intersections of the second set of two or more TX electrodes and the second set of two or more RX electrodes, the second capacitance is determined from a generated second digital value representative of the second capacitance for the second unit cell;

generating a first image based on the first capacitance;

generating a second image based on the second capacitance; and generating a combined image based on the first image and the second image, and determining, based on the first capacitance and the second capacitance, a presence of a ridge or valley of a fingerprint on the touch panel of electrodes, wherein the at least four intersections of the second unit cell comprise at least two intersections of the first unit cell, wherein a first number of TX electrodes of the first and second sets of two or more TX electrodes is different than a second number of RX electrodes of the first and second sets of two or more RX electrodes, and wherein the combined image comprises:
an odd pixel column comprising the first capacitance, and
an even pixel column comprising the second capacitance.

3. The method of claim 2, wherein the concurrently driving the first set of two or more TX electrodes of the touch panel of electrodes comprises causing a multiplexer coupled to the two or more TX electrodes to electrically couple the two or more TX electrodes to concurrently drive a signal on the two or more TX electrodes.

4. The method of claim 2, wherein the concurrently receiving the two or more first signals from the first set of two or more RX electrodes comprises causing a multiplexer coupled to the two or more RX electrodes to electrically couple the two or more RX electrodes to concurrently receive the two or more first signals on the two or more RX electrodes.

5. A touch detection system comprising:
a touch panel of electrodes comprising:
a first set of drive (TX) electrodes disposed along first axis of the touch panel;
a first set of two or more sensing (RX) electrodes disposed along a second axis of the touch panel, the first set of TX electrodes and the first set of two or more RX electrodes forming a first intersection and a second intersection, wherein a first number of TX electrodes in the first set of TX electrodes is different than a second number of RX electrodes in the first set of two or more RX electrodes; and
a second set of two or more RX electrodes disposed along the second axis of the touch panel, the first set of TX electrodes and the second set of two or more electrodes forming the second intersection and a third intersection;

a scan control circuit, operatively coupled to the touch panel of electrodes, to concurrently select the first set of two or more electrodes and to concurrently selected the second set of two or more electrodes via a multiplexer;

an analog front end (AFE) configured to:
generate a first digital value representative of a first mutual capacitance of a first unit cell, wherein the first unit cell comprises the first intersection and the second intersection; and
generate a second digital value representative of a second mutual capacitance of second a unit cell, wherein the second unit cell comprises the second intersection and the third intersection;

a channel engine, operatively coupled to the AFE, configured to generate a first capacitance value and a second capacitance value corresponding to the first unit cell and the second unit cell, respectively; and a memory, operatively coupled to the AFE, configured to store the first capacitance value and the second capacitance value generated by the channel engine, a fingerprint controller that determines, based on a combined image, a presence of a ridge or valley of a fingerprint on the touch panel of electrodes, wherein the combined image is generated based on a first image, which is generated based on the first capacitance value, and a second image, which is generated based on the second capacitance value, and wherein the combined image comprises:
an odd pixel column comprising the first capacitance value; and
an even pixel column, comprising the second capacitance value.

6. The touch detection system of claim 5, wherein to concurrently select the first set of two or more RX electrodes the scan control circuit is to: drive a first signal on the first set of TX electrodes; and cause the multiplexer to electrically couple the first set of two or more RX electrodes to concurrently receive a second signal generated from a current induced on the first set of two or more RX electrodes in response to the first signal.

7. The touch detection system of claim 5, wherein the first set of TX electrodes comprises a first set of two or more drive (TX) electrodes forming at least four intersections with the first set of two or more RX electrodes, and wherein the scan control circuit is further to: cause the multiplexer to electrically couple the second set of two or more TX electrodes to concurrently drive a first signal on the two or more TX electrodes; and cause the multiplexer to electrically couple the first set of two or more RX electrodes to concurrently receive a second signal generated from a current induced on the first set of two or more RX electrodes in response to the first signal.

8. The touch detection system of claim 5, wherein a first number of TX electrodes in a second set of two or more TX electrodes is the same as a second number of RX electrodes in the first set of two or more RX electrodes.

* * * * *